United States Patent
Fredholm et al.

(10) Patent No.: US 8,443,628 B2
(45) Date of Patent: May 21, 2013

(54) METHOD FOR MANUFACTURING NON-PLANAR GLASS-CERAMIC PRODUCTS

(75) Inventors: Allan Fredholm, Vulaines sur Seine (FR); Christophe Pierron, Avon (FR); Claude Vanotti, Ponthierry-Saint Fargeau (FR)

(73) Assignee: Eurokera, Chateau-Thierry (FR)

( * ) Notice: Subject to any disclaimer, the term of this patent is extended or adjusted under 35 U.S.C. 154(b) by 59 days.

(21) Appl. No.: 12/517,698

(22) PCT Filed: Dec. 4, 2007

(86) PCT No.: PCT/EP2007/063281
§ 371 (c)(1),
(2), (4) Date: Jun. 4, 2009

(87) PCT Pub. No.: WO2008/068254
PCT Pub. Date: Jun. 12, 2008

(65) Prior Publication Data
US 2010/0077798 A1    Apr. 1, 2010

(30) Foreign Application Priority Data
Dec. 5, 2006 (FR) .................................. 06 55320

(51) Int. Cl.
*C03B 23/02* (2006.01)

(52) U.S. Cl.
USPC ............................................................. 65/64

(58) Field of Classification Search
USPC ............................................................. 65/64
See application file for complete search history.

(56) References Cited

U.S. PATENT DOCUMENTS

| | | | | |
|---|---|---|---|---|
| 3,266,912 A | * | 8/1966 | Murphy | 65/33.4 |
| 3,681,043 A | * | 8/1972 | Bognar | 65/33.2 |
| 4,009,064 A | * | 2/1977 | Andrews | 156/102 |
| 5,070,045 A | * | 12/1991 | Comte et al. | 501/4 |

FOREIGN PATENT DOCUMENTS
EP    0963957    *    3/2004

OTHER PUBLICATIONS

Yue, Yuanzhang, et al. "Fictive Temperature, Cooling Rate and Viscosity of Glasses". J. of Chem Physics. vol. 20, No. 17, pp. 8053-8059. May 2004.*

* cited by examiner

*Primary Examiner* — Joseph S Del Sole
*Assistant Examiner* — Russell Kemmerle, III
(74) *Attorney, Agent, or Firm* — Michael W. Russell

(57) ABSTRACT

The present invention relates to a method for manufacturing a non-planar product in glass-ceramic. Said method comprises the following steps: (i) in a conventional furnace (3), heating a sheet of precursor glass of said glass-ceramic, so that said sheet becomes formable while avoiding its ceramming; (ii) forming said heated sheet; (iii) cooling said formed sheet (2b); (iv) ceramming said formed, cooled sheet.

12 Claims, 4 Drawing Sheets

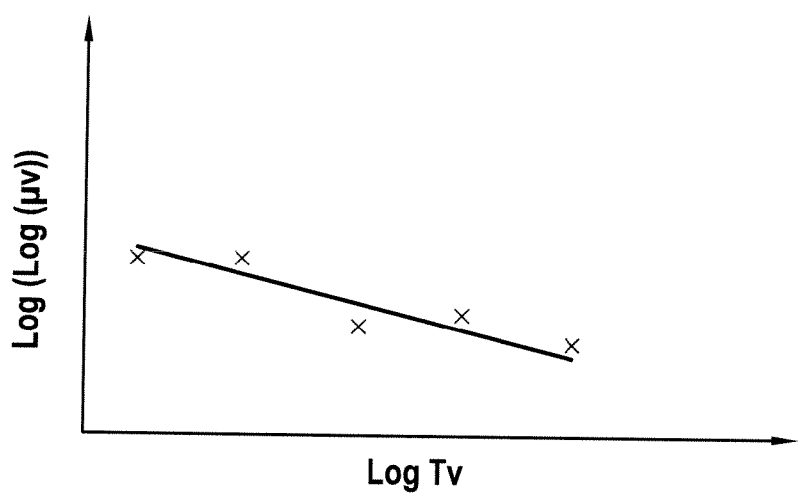
FIG.1A1
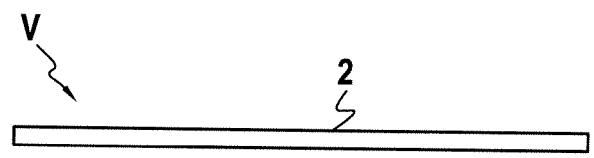
FIG.1A2
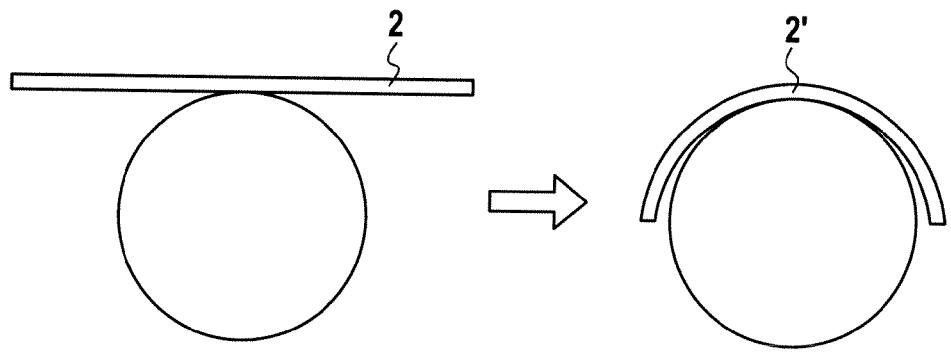
FIG.1A3

METHOD FOR MANUFACTURING NON-PLANAR GLASS-CERAMIC PRODUCTS

TECHNICAL FIELD

The present invention concerns a method for making glass-ceramic products. In particular, the present invention concerns a method for manufacturing non-planar (non flat) glass-ceramic products. Said method is particularly suitable, from an economic viewpoint, for the production in limited series or small quantities of such products.

BACKGROUND

Glass-ceramics, in particular glass-ceramics containing a solid solution of β-quartz or a solid solution of β-spodumene as main crystalline phase, have properties of major interest, in particular a thermal expansion coefficient very close to zero. These properties fully enable said glass-ceramics to be used in situations in which they are brought to relatively high temperatures, and in which they may be alternately subjected to high and low temperatures, possibly only over part of their surface. The manufacture of said glass-ceramics essentially comprises three steps, consisting of obtaining a molten precursor glass, followed by cooling and forming said molten precursor glass, then ceramming said molten, formed precursor glass. The forming of said molten precursor glass has recourse to conventional methods, such as rolling the glass between two rollers to produce sheets of constant thickness, and compressing the glass for the manufacture of items such as tableware items.

Today, the vast majority of glass-ceramic production corresponds to the manufacture of infrared or induction cooking tops, the manufacture of windows able to withstand very high temperatures such as stove windows. In most cases, flat sheets of glass-ceramic are desired, and rolling the glass proves to be a method of choice to format the sheets of precursor glass. However, some cases require the manufacture of parts of essentially constant thickness but which have a non-planar shape.

Persons skilled in the art know how to obtain glass parts of non-planar shape from sheets of glass obtained using the "Float" process for example: deforming said reheated glass sheets. Said process is routinely used and applied in particular for the manufacture of automotive windscreens and windows. Said process comprises the three following main steps:
  a. heating a glass sheet up to a temperature allowing the glass to deform;
  b. deforming the heated sheet (under gravity, a vacuum, molding, compression . . . ); and
  c. controlled cooling of said deformed glass sheet.

Whereas methods for manufacturing deformed or non-planar glass from planar glass sheets are well mastered by those skilled in the art, the transposition of said methods to precursor glasses of glass-ceramics is problematic. The range of temperatures under which the deformation of the precursor glass is possible generally covers the range of temperatures at which ceramming occurs, or at least at which said ceramming is initiated.

A few methods have been developed taking these constraints into account, in particular the method described in patent application FR 2 735 562. Said method proposes to directly form, from a delivered mass of a molten glass precursor of the final glass-ceramic (a glass gob), a non-planar precursor glass by molding which after ceramming, is converted into a glass-ceramic. This method is very efficient for the mass production of said non-planar glass-ceramics, but requires a complex, costly installation whose use is not economically advantageous for the production of prototypes or the production of limited series.

The methods described in patent applications FR 2 726 350 and FR 2 777 559 form alternatives, based on one same principle, to produce non-planar glass-ceramics by deformation. Application FR 2 726 350 describes a method to produce cooking tops having folded edges, and application FR 2 777 559 a method for producing cooking tops whose openings have a deformed surround. These two methods include very rapid heating of a local area of the sheet of precursor glass, followed by forced deformation of said heated local area. These methods carried out with burners (which imply a significant portion of heat transferred by forced convection) are only suitable to generate local deformations.

Patent applications DE 100 47 576 and EP 1 171 391 describe another type of method enabling the manufacture of non-planar glass-ceramics, based on the use of infrared energy (very high energy process). The infrared energy can heat an entire sheet of precursor glass rapidly before it is deformed by different means. Said method requires the use of infrared radiating equipment having high energy densities and sophisticated tooling (moulds) surfaces. The cost of the equipment is high and the operation requires special precautions, in particular impeccable cleanliness to avoid damaging the highly transparent surfaces or highly reflective surfaces used in infrared lamp technology.

Patent applications DE 101 02 576 and FR 2 866 642 teach the forming of sheets of precursor glass during the ceramming cycle. In particular, application FR 2 866 642 describes that the precursor glass can be deformed during a short period corresponding to the time at which a temporary decrease in viscosity is observed due to latent crystallization heat. The methods proposed by these documents DE 101 02 576 and FR 2 866 642 make it possible to manufacture parts of complex shape, but they entail the use of a complex installation to conduct ceramming of the sheets of precursor glass. Insofar as the ceramming cycles last one hour, even more, and take place in continuous production furnaces, persons skilled in the art will understand that efficient production requires extensive tooling and corresponding major investment. For example, as described in application FR 2 866 642 a ceramming gallery having specific characteristics to conduct forced deformation requires a heavy investment.

U.S. Pat. Nos. 3,681,043 and 4,009,064 describe methods in which the steps of forming and nucleation/ceramming are not clearly separated. The annealing or further heat treatment mentioned in U.S. Pat. No. 4,009,064 is carried out on a formed article at least partially cerammed.

In said context, the present invention proposes a method for manufacturing non-planar (non flat) products in glass-ceramic. Said method is particularly suitable, in particular from an economic viewpoint, for the production of limited series or of small quantities of non-planar products in glass-ceramic. It has the advantage that it can be implemented with an installation requiring moderate investment.

SUMMARY

The first subject-matter of the invention is therefore a method for manufacturing a non-planar product in glass-ceramic comprising the following steps: (I) in a conventional furnace, heating a sheet of precursor glass of said glass-ceramic, so that said sheet becomes formable while avoiding its ceramming; (II) forming said heated sheet; (III) cooling said formed sheet; and (IV) ceramming said formed, cooled sheet.

According to certain embodiments of the method of the present invention, said sheet in said precursor glass of said glass-ceramic has a thickness of 3 to 7 mm.

According to certain embodiments of the method of the present invention, the method comprises the following preliminary steps:
  a. determining a range of working viscosities $\mu_t$ of a reference sheet in a precursor glass of said glass-ceramic; working viscosities $\mu_t$ at which said reference sheet in said precursor glass (V) is able to deform before the onset of ceramming;
  b. determining a range of furnace operating temperatures, delimited by a lower temperature and an upper temperature; said lower temperature allowing a reference sheet in said precursor glass to be brought to a deformable state within a time of less than 10 minutes, advantageously less than 5 minutes, and said upper temperature corresponding to the maximum temperature of the furnace to which said reference sheet in said precursor glass can be exposed, for 30 to 90 seconds, before the onset of ceramming.

According to certain embodiments of the method of the present invention, the determination of the range of working viscosities $\mu_t$ of said reference sheet in said precursor glass of said glass-ceramic comprises the following steps:
  aa1 determining, for said precursor glass, pairs of temperature $T_V$/viscosity) $\mu_t$ values, for viscosity values ranging from $10^2$ to $10^{12}$ Pa·s ($10^3$ to $10^{13}$ Po);
  aa2 deducing, from these viscosity and temperature values, the coefficients A and B of the equation representing the curve relating viscosity to temperature: $Log(Log(\mu_V))=A-B\times Log(T_V)$, wherein $T_V$ is the temperature of said precursor glass in degrees Celsius (° C.), $\mu_V$ is the viscosity in poises (Po) and Log is the decimal logarithm or base 10 logarithm.

According to certain embodiments of the method of the present invention, said determination of the range of working viscosities μt of said reference sheet in said precursor glass of said glass-ceramic also comprises the following steps:
  aa3 determining, at least approximately, on the one hand the highest temperature $T_{Vmax}$ of said reference sheet in said precursor glass to which said reference sheet can be brought, after being placed in a furnace 30 to 90 s, without showing any onset of ceramming, and on the other hand the lowest temperature $T_{Vmin}$ of said reference sheet in said precursor glass on and after which said reference sheet is able to deform within a time of less than 10 min, advantageously less than 5 min;
  aa4 from the viscosity curve obtained at step aa2 and the temperatures obtained at step aa3, deducing a range of working viscosities $\mu_t$ in which said reference sheet in said precursor glass is able to deform without initiated ceramming.

According to certain embodiments of the method of the present invention, said determination of the range of working viscosities μt of said reference sheet in said precursor glass of said glass-ceramic also comprises the following step:
  aa'3 with respect to a sheet of equal or similar thickness in another precursor glass whose range of viscosities has been determined subsequent to steps aa1, aa2, aa3, aa4 above, said other precursor glass having a composition close to that of said precursor glass, reasoning by analogy and considering that the range of working viscosity $\mu_t$ of said reference sheet in said precursor glass is the same as that of the reference sheet in said other precursor glass.

According to certain embodiments of the method of the present invention, the method comprises the following steps:
  c. heating a conventional furnace containing a mould whose working surface is connected via at least one channel, through the structure of said mould, to a vacuum-creating device, up to a temperature $T_F$ lying to within said range of operating temperatures; said working surface of said mould having a shape adapted to impart the desired shape for said glass-ceramic to said sheet of precursor glass;
  d. placing a sheet in said precursor glass of said glass-ceramic on said mould; said sheet being of equal or similar thickness to that of the said reference sheet;
  e. leaving said sheet on said mould in said furnace at said temperature $T_F$, until it reaches a viscosity $\mu$ lying within said range of working viscosities $\mu_t$;
  f. applying a vacuum, at said at least one channel of said mould, to said sheet which has reached said viscosity $\mu$, thereby enabling said sheet to assume the shape of the mould;
  g. removing the non-planar sheet obtained from the furnace and leaving it to cool;
  h. proceeding with ceramming said non-planar sheet in said precursor glass of said glass-ceramic, to obtain said desired non-planar product in glass-ceramic.

According to certain embodiments of the method of the present invention, the sheet in said precursor glass of said glass-ceramic is pre-heated before it is placed in the conventional furnace.

According to certain embodiments of the method of the present invention, the cooling of said non-planar sheet is controlled.

According to certain embodiments of the method of the present invention, said precursor glass is a precursor glass of a glass-ceramic containing a solid solution of β-quartz or β-spodumene as main crystalline phase.

According to certain embodiments of the method of the present invention, the range of working viscosities pit of said reference sheet in said precursor glass lies between $10^{6.30}$ and $10^{7.75}$ Pa·s ($10^{7.30}$ and $10^{8.75}$ Po) and/or, advantageously and, the working viscosity of the furnace lies between $10^{5.6}$ and $10^{7.4}$ Pa·s ($10^{6.6}$ and $10^{8.4}$ Po).

According to certain embodiments of the method of the present invention, said conventional furnace comprises a lower part and an upper part able to be separated from each other at least in part; said lower part being preferably able to be lowered.

According to certain embodiments of the method of the present invention, said sheet in said precursor glass placed on said mould, before application of the vacuum via at least one channel advantageously arranged in the centre of said mould, is stabilized on its periphery by mechanical means and/or by application of a vacuum via at least one channel arranged on the periphery of said mould.

The present invention has the following advantages. Complex shape of a glass-ceramic article can be achieved in a conventional furnace by using the method of the present invention.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

BRIEF DESCRIPTION OF THE DRAWINGS

The accompanying drawings, which are incorporated in and constitute a part of this specification, illustrate certain embodiments of the instant invention and together with the description, serve to explain, without limitation, the principles of the invention.

FIGS. 1A1, 1A2, 1A3, 1B to 1F schematically illustrate the different steps of the preferred variant of embodiment of the method of the invention.

FIG. 2 is an exploded cross-sectional view of a type of mould which may be used for the said method.

FIG. 3 is a schematic cross-section of a non-planar product in glass-ceramic having the shape of a wok which can be obtained with the method of the invention.

DETAILED DESCRIPTION

Figure 1B:
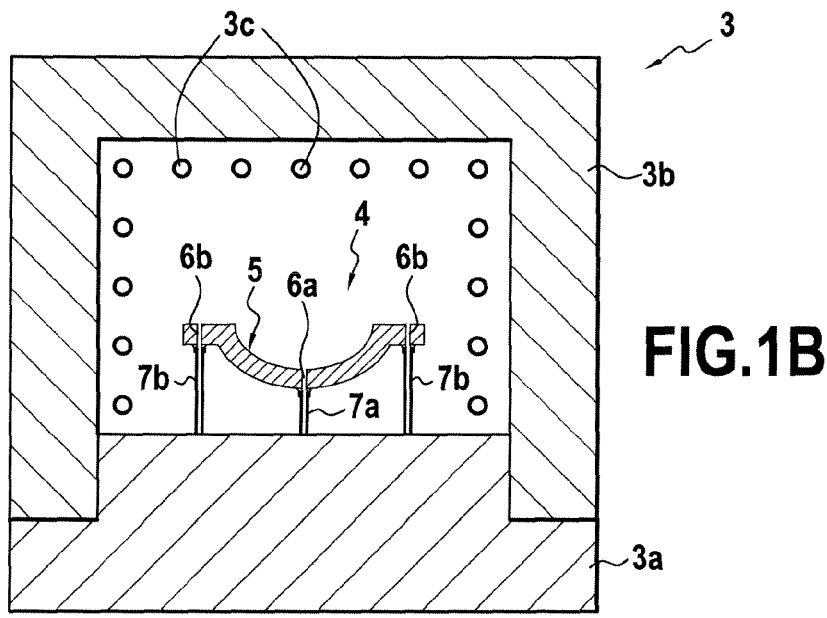

The following description of the invention is provided as an enabling teaching of the invention in its best, currently known embodiment. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Unless otherwise indicated, all numbers such as those expressing weight percents of ingredients, dimensions, and values for certain physical properties such as viscosity used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, the singular forms "a," "an" and "the" include plural referents unless the context clearly dictates otherwise. Thus, for example, reference to a "glass-ceramic material" includes embodiments having two or more such glass-ceramic materials unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, a "wt %" or "weight percent" or "percent by weight" of a component, unless specifically stated to the contrary, is based on the total weight of the composition or article in which the component is included.

The method of the invention (see above the first subject-matter of the said invention), characteristically, uses as starting material a glass sheet (and not a gob) and comprises heating said glass sheet (in its entirety) in a conventional furnace (and not in a furnace delivering a very high energy, such as a furnace equipped with an infrared source). The inventors have shown, in quite unexpected manner, that it is possible to control the implementation of said method, conventional per se, with sheets in a precursor glass of a glass-ceramic; that it is possible to control heating so that said sheet in a glass-ceramic precursor glass can be made formable while avoiding its ceramming. According to the method of the invention, the steps of forming and nucleation/ceramming are clearly separated. The formed sheet is cooled before being cerammed.

The notion of sheets is familiar to those skilled in the art. Said sheets generally have a thickness of 3 to 7 mm. The most common sheets manufactured today have a thickness of 4 mm or approximately 4 mm.

Conventional heating is generally conducted in a resistance furnace (is more generally conducted in a furnace with electrical resistances).

Forming gives the heated sheet the desired shape for the end product. Different variants can be used for deforming a glass sheet. Said sheet can be deformed by overpressure, compression or vacuum, or by a combination of these methods. Those skilled in the art know these deformation techniques. Preferably vacuum deformation is used.

Cooling is intended to lower the temperature, at least down to a temperature at which the ceramming cycle of the precursor glass forming the glass to sheet is initiated.

The formed sheet can be cerammed as soon as it is cooled, at an adequate temperature (with reference to said ceramming cycle), generally in the order of 700° C., or after being stored for greater or lesser time at room temperature (25° C.).

The control of conventional heating may be the result of different approaches. At all events, it is based on knowledge of the starting material (the sheet of precursor glass of the glass-ceramic) and knowledge of the tooling used (conventional furnace) to conduct the heating of the said starting material.

For said control of conventional heating, the method of the invention advantageously comprises the following preliminary steps: (a) determining a range of working viscosities $\mu_t$ of a reference sheet in a precursor glass of said glass-ceramic; working viscosities $\mu_t$ at which said reference sheet in said precursor glass is able to deform (hence is able to be deformed) before the onset of ceramming; and (b) determining a range of furnace operating temperatures, delimited by a lower temperature and an upper temperature; said lower temperature allowing a reference sheet in said precursor glass to be brought to a deformable state within a time of less than 10 minutes, advantageously less than 5 minutes, and said upper temperature corresponding to the maximum temperature of the furnace to which said reference sheet in said precursor glass can be exposed, for 30 to 90 seconds, before the onset of ceramming.

With reference to the range of working viscosities $\mu_t$, it is to be understood that it must be possible to obtain the desired result—possible deformation of the reference sheet without initiation of ceramming—within a reasonable time (generally desired to be between 30 s and 10 min).

These preliminary steps are conducted with reference sheets which correspond to the glass sheet (or glass sheets) used in the method of the invention. The reference sheets and the sheets used in the method of the invention are identical (same glass composition and same sheet thickness) or similar i.e. having minor variations (close glass composition and/or sheet thickness).

These preliminary steps are implemented in the conventional furnace intended to be used for conducting the method of the invention, or at least in a furnace of similar thermal operation. Those skilled in the art will evidently understand that the results of said preliminary steps must be transposable to the context in which the method of the invention is implemented.

To control the forming of said reference sheet (and therefore the conducting of the method of the invention) it is therefore recommended to determine on the one hand a range of working viscosities $\mu_t$ of said reference sheet, and on the other hand a range of operating temperatures for the conventional furnace under consideration. In this manner the response of the material to the heating tool can be assessed, i.e. the deformation sensitivity of said reference sheet in said precursor glass, while controlling the "non-ceramming" of said material.

Advantageously, determining the range of working viscosities $\mu_t$ of said reference sheet in said precursor glass of the glass-ceramic comprises the following steps:

aa1 determining, for said precursor glass, pairs of temperature $T_V$/viscosity $\mu_t$ values, for viscosity values ranging from $10^2$ to $10^{12}$ Pa·s ($10^3$ and $10^{13}$ Po);

aa2 deducing, from these viscosity and temperature values, the coefficients A and B of the equation representing the curve relating viscosity to temperature: $Log(Log(\mu_V))=A-B\times Log(T_V)$, wherein $T_V$ is the temperature of said precursor glass in degrees Celsius (° C.), $\mu_V$ is the viscosity in poises (Po) and Log is the decimal logarithm or base 10 logarithm.

Persons skilled in the art know the methods for obtaining the viscosity values of said precursor glass corresponding to temperature values of said precursor glass. To determine these pairs of values, viscosity measurements are advantageously conducted for high temperatures, and when the viscosity values are too high the glass transition temperature of the precursor glass is then measured by dilatometry, by setting the viscosity of said precursor glass at $10^{12.3}$ Pa·s ($10^{13.3}$ Po). These pairs of values are used to characterize the precursor glass of the glass-ceramic with the curve relating viscosity to temperature: $Log(Log(\mu_V))=A-B\times Log(T_V)$.

Determining the range of working viscosities $\mu_t$ of said reference sheet in said precursor glass of said glass-ceramic further generally comprises the following steps:

aa3 determining, at least approximately, on the one hand the highest temperature $T_{Vmax}$ of said reference sheet in said precursor glass to which said reference sheet can be brought, after being placed in a furnace 30 to 90 s, without showing any onset of ceramming, and on the other hand the lowest temperature $T_{Vmin}$ of said reference sheet in said precursor glass on and after which said reference sheet is able to deform within a time of less than 10 min, advantageously less than 5 min (this determination does not need to be, and generally is not made with extreme accuracy. Therefore, in practice, it is usually sufficient to place $T_{Vmax}$ between a temperature $T_1$ in which no ceramming occurs and a temperature $T_2$ at which ceramming is initiated: $T_1 < T_{Vmax} < T_2$; to identify a temperature $T_{Vmin}$ at which deformation is obtained within a reasonable time);

aa4 from the viscosity curve obtained at step aa2 and the temperatures obtained at step aa3, deducing a range of working viscosities $\mu_t$ in which said reference sheet in said precursor glass is able to deform without initiated ceramming.

The temperatures $T_{Vmax}$ and $T_{Vmin}$ form essential parameters of the reference sheet in said precursor glass. They provide the viscosities of said reference sheet (and hence those of the sheet used as starting material in the method of the invention) at which said reference sheet (and hence said sheet used as starting material) can be formed or deformed.

From the curve of the viscosity of the precursor glass in relation to the temperature of said precursor glass, it is possible to determine more rapidly the range of working viscosities $\mu_t$ of said reference sheet in said precursor glass, by proceeding as follows:

aa'3 with respect to a sheet of equal or similar thickness in another precursor glass whose range of viscosities has been determined subsequent to steps aa1, aa2, aa3, aa4, said other precursor glass having a composition close to that of said precursor glass, reasoning by analogy and considering that the range of working viscosities $\mu_t$ of said reference sheet in said precursor glass is the same as that of the reference sheet in said other precursor glass.

This approach, with which it is possible to determine the range of working viscosities of the reference sheet in precursor glass more rapidly, can evidently only be conducted if all the parameters (viscosity curve, temperatures $T_{Vmax}$ and $T_{Vmin}$, range of viscosities) are already known for another sheet of equal or similar thickness in a precursor glass whose composition is close to that of said precursor glass.

After so determining the "parameters"—range of working viscosities of the reference sheet and range of furnace operating temperatures—on completion of the preliminary steps, the method of the invention such as explained above can be implemented and fully controlled.

According to one advantageous variant of embodiment, said method according to the invention comprises the following steps:

c. heating a conventional furnace containing a mould whose working surface is connected via at least one channel, through the structure of said mould, to a vacuum-creating device, up to a temperature $T_F$ lying in the range of operating temperatures (previously determined); said working surface of said mould having a shape adapted to impart the desired shape to a sheet of precursor glass of the glass-ceramic, the desired shape for the desired non-planar glass-ceramic product;

d. placing a sheet in said precursor glass of said glass-ceramic on said mould; said sheet being of equal or similar thickness to that of the said reference sheet;

e. leaving said sheet on said mould in said furnace at said temperature $T_F$, until it reaches a viscosity $\mu$ a lying within said range of working viscosities (previously determined);

f. applying a vacuum, at said at least one channel of said mould, to said sheet which has reached said viscosity $\mu$, thereby enabling said sheet to assume the shape of the mould;

g. removing the non-planar sheet obtained from the furnace and leaving it to cool;

h. proceeding with ceramming said non-planar sheet in said precursor glass of said glass-ceramic, to obtain said desired non-planar product in glass-ceramic.

The furnace heated to said temperature $T_F$ is a conventional furnace whose structure advantageously comprises electric resistances (which ensure heating under a Joule effect). Said furnace contains means able to form the sheet in precursor glass of the glass-ceramic: a mould associated with a vacuum-creating device. Under this advantageous variant of embodiment of the method of the invention, a vacuum method was chosen for forming, deforming the heated sheet. Said vacuum-creating device, via at least one channel through the mould structure, allows deformation of the heated sheet by flattening said sheet against the working surface of the mould. Evidently, the positioning of said at least one channel in the mould structure is advantageously optimized in relation to the shape of said mould. Hence, advantageously, said channel is found in the bottom concave part(s) of the mould. In the context of a mould suitable for manufacturing a wok, said channel is advantageously arranged in the centre of the mould.

Also [in the general context of implementing the method of the invention, and more particularly in the context of implementing the advantageous variant specified above (comprising steps c to h)], the furnace structure advantageously comprises a lower part and an upper part, able to be separated from each other, at least in part; it preferably being possible for said lower part to be lowered. This furnace configuration is of interest since it facilitates insertion of the planar sheet in precursor glass, and the removal of the non-planar sheet in said precursor glass.

The sheet of said precursor glass of said glass-ceramic, to be placed in said pre-heated furnace and to be positioned on said mould, generally has a thickness of 3 to 7 mm as indicated above.

Advantageously [in the general context of implementing the method of the invention, and more particularly in the context of implementing the advantageous variant specified above (comprising steps c to h)], the glass in said precursor glass of said glass-ceramic is pre-heated before it is placed in the furnace. Said sheet therefore reaches viscosity $\mu$ more rapidly, lying in the range of working viscosities $\mu_t$, and the method of the invention is accelerated.

The sheet placed in the furnace and positioned on the mould is advantageously stabilized on the mould using suitable means. These may be mechanical means and/or vacuum-creating means arranged on the perimeter of the mould. This stabilization is evidently most expediently ensured before applying the vacuum intended to deform said sheet. It ensures uniform deformation of the sheet: it prevents the ends of said sheet from lifting up after creation of the vacuum intended to ensure the deformation.

Therefore the sheet of precursor glass placed on the mould, before the deforming vacuum is applied via at least one channel preferably arranged in the centre of said mould, is advantageously stabilized on its periphery using mechanical means and/or by applying a vacuum via at least one channel arranged on the periphery of said mould.

The sheet positioned on the mould in the furnace at temperature $T_F$ reaches the targeted viscosity $\mu$ in less than 10 minutes, advantageously less than 5 minutes. It can then be deformed by applying a vacuum through the mould structure. It is to be noted incidentally that said vacuum application, for deformation purposes, can be initiated before said sheet reaches viscosity $\mu$. It can be initiated as soon as said sheet is placed in the furnace.

With the previous determination of the implementation parameters for the method ($T_F$, $\mu_t$), it is possible to achieve deformation while avoiding ceramming.

After deformation of the sheet, cooling of the non-planar sheet is necessary to initiate the ceramming cycle (see above). Preferably [in the general context of implementing the method of the invention, and more particularly in the context of implementing the advantageous variant specified above (comprising steps c to h)], the cooling of said non-planar sheet is controlled, in particular to prevent excessive internal stresses (likely to causing immediate or deferred breakage of said sheet).

The cooled, deformed sheet obtained can then be cerammed, in conventional manner.

The glass forming the heated, deformed, cooled and finally cerammed glass sheet according to the method of the invention is advantageously a precursor glass of a glass-ceramic containing a solid solution of β-quartz or β-spodumene as main crystalline phase. By this it is meant that said solid solution of β-quartz or β-spodumene represents at least 50%, generally at least 70 weight % of the crystalline phase. It may in particular be a lithium aluminosilicate glass. This type of glass is well known and described for example in FR-A-2 657 079 (U.S. Pat. No. 5,070,045), FR-A-2 612 510 and EP-A-0 220 333.

For this type of precursor glass, a range of working viscosities $\mu_t$ was determined for reference sheet, lying between $10^{6.30}$ and $10^{7.75}$ Pa·s ($10^{7.30}$ and $10^{8.75}$ Po) and/or, advantageously and, a furnace working viscosity of between $10^{5.6}$ and $10^{7.4}$ Pa·s ($10^{6.6}$ and $10^{8.4}$ Po). Said furnace working viscosity corresponds to the viscosity of the reference sheet in precursor glass which would be obtained at the operating temperature of the furnace if said reference sheet reached its equilibrium temperature. This definition of the furnace working viscosity applies to all types of precursor glass in the context of the invention.

With glass sheets in precursor glass of a β-quartz or β-spodumene glass-ceramic, the method of the invention is therefore advantageously implemented using the working viscosities and furnace viscosities indicated above.

A description will now be made of the method of the invention, that is in no way limiting, with reference to the appended figures.

FIGS. 1A1, 1A2 and 1A3 schematize implementation of the preliminary steps (steps aa1 to aa4 above), whose purpose is to obtain the range of working viscosities $\mu_t$ of a reference sheet 2 in a precursor glass V of the glass-ceramic under consideration.

With reference to FIG. 1A1, for said precursor glass V, pairs of values temperature $T_V$/viscosity $\mu_V$ is determined for high temperatures with corresponding viscosities [$10^2$, $10^3$, $10^4$ Pa·s . . . ($10^3$, $10^4$, $10^5$ Po.)]. For the high viscosity values, direct measurements are no longer possible. In this case, the glass transition temperature is measured by dilatometry setting the viscosity of the precursor glass at $10^{12.3}$ Pa·s ($10^{13.3}$ Po). From these viscosity and temperature values, the coefficients A and B are deduced of the equation representing the viscosity curve in relation to temperature: $\mathrm{Log}(\mathrm{Log}(\mu_V))=\mathrm{A}-\mathrm{B}\times\mathrm{Log}(T_V)$, in which $T_V$ is the temperature of said precursor glass V in degrees Celsius (° C.), $\mu_V$ is the viscosity in poises (Po) and Log is the decimal logarithm or base 10 logarithm. FIG. 1A1 shows said viscosity curve in relation to temperature, of equation: $\mathrm{Log}(\mathrm{Log}(\mu_V))=\mathrm{A}-\mathrm{B}\times\mathrm{Log}(T_V)$.

Figure 2:
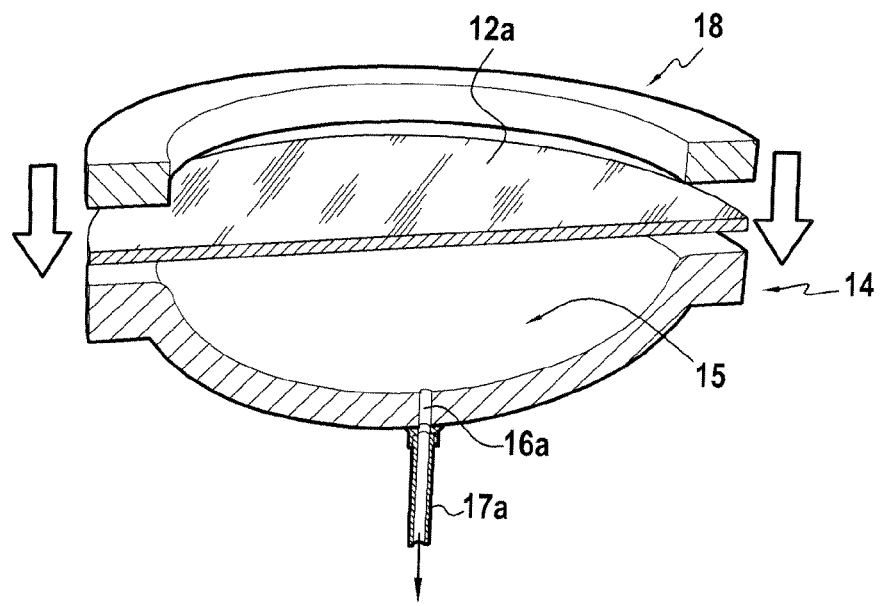

With reference to FIG. 1A2, the temperature $T_{Vmax}$ is "determined", which is the highest temperature of said reference sheet 2 in said precursor glass V to which said reference sheet 2 can be brought, for 30 to 90 s, without showing any onset of ceramming. For this purpose, said reference sheet 2 is subjected to a visual heating test in a conventional furnace.

Figure 3:
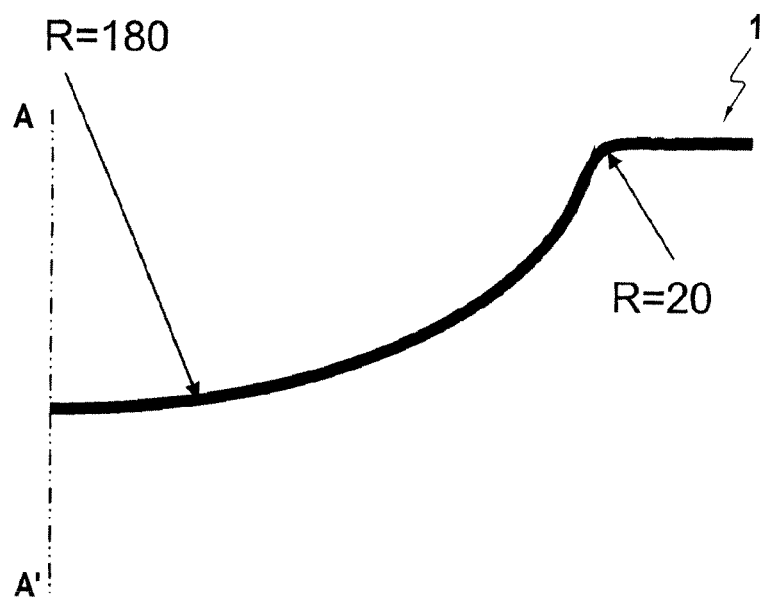

With reference to FIG. 1A3, the temperature $T_{Vmin}$ is determined which is the lowest temperature of said reference sheet 2 in said precursor glass V on and after which said reference sheet 2 is able to deform. For this purpose, said reference sheet 2 is subjected to a deformation test: said reference sheet 2 is placed in a conventional furnace on a roller lying horizontally, and it is observed at which temperature $T_{Vmin}$ said reference sheet 2 deforms under its own weight in less than 10 min (gravity effect). The deformed reference sheet is indicated 2'.

From the curve of viscosities (FIG. 1A1) and the temperatures $T_{Vmax}$ and $T_{Vmin}$ respectively obtained by the ceramming tests (FIG. 1A2) and deformation tests (FIG. 1A3), a range of working viscosities $\mu_t$ is deduced for said reference sheet 2 in said precursor glass V of said glass-ceramic, within which said reference sheet 2 in said precursor glass V is able to deform (or be deformed) without initiating ceramming.

In parallel a range of operating temperatures is determined for the conventional furnace used (range between said lower and upper temperatures, specified above in this description). This determination step is not shown in the figures.

The method of the invention can then be implemented as illustrated in FIGS. 1B to 1F.

With reference to FIG. 1B, a conventional furnace 3 with electric resistances 3c is heated up to a temperature $T_F$ lying in the range of operating temperatures of said furnace. The conventional furnace 3 comprises an upper part 3b, and a lower part 3a that can be lowered. Said furnace 3 contains a mould 4 whose working surface 5 is connected, via three channels 6a,6b through the structure of said mould 4, to a vacuum-creating device 7a+7b. It will easily be understood that the vacuum-creating device is not shown, but that channels 7a, 7b form extensions thereof transmitting the vacuum via channels 6a and 6b at the working surface 5 of mould 4. Said working surface 5 of said mould 4 is wok-shaped adapted to impart the desired shape to a sheet in precursor glass V of a glass-ceramic.

Figure 1C:
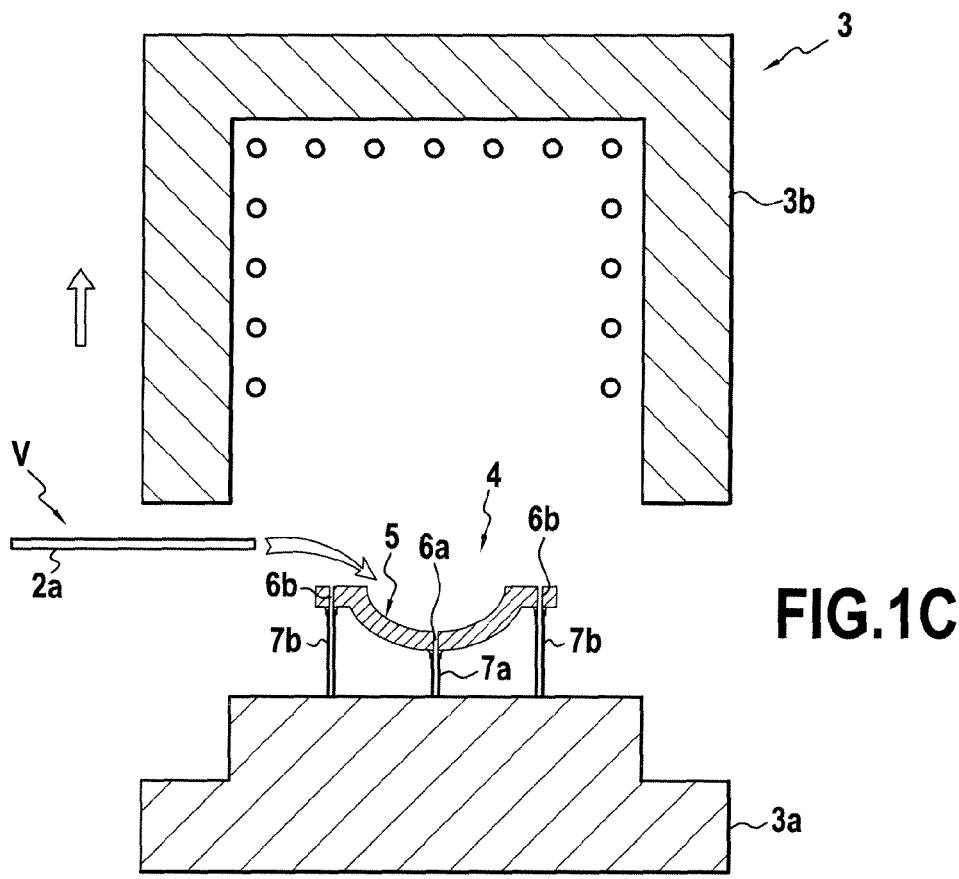

With reference to FIG. 1C, a sheet 2a in said precursor glass V, of equal or similar thickness to the reference sheet 2, is placed in said conventional furnace 3 and is positioned on said mould 4.

Figure 1F:
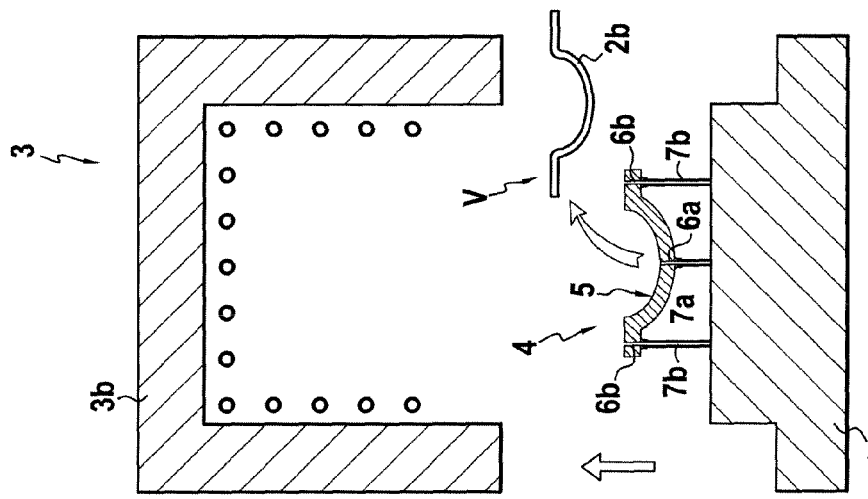
Figure 1E:
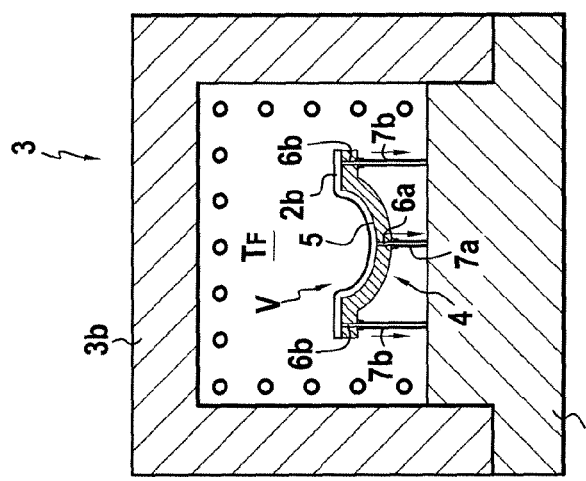
Figure 1D:
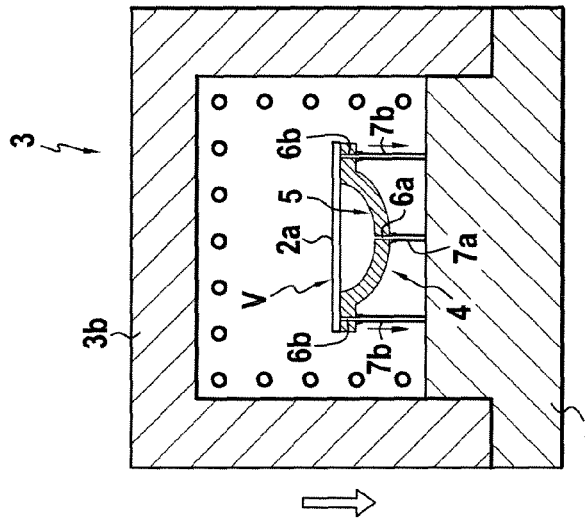

With reference to FIG. 1D, said sheet 2a is stabilized on said mould 4 by applying a stabilizing vacuum via channels 6b located on the periphery, and said sheet 2a is left on said mould 4 in said furnace 3 at temperature $T_F$ until it reaches a viscosity $\mu$ lying in the range of working viscosities $\mu_t$.

With reference to FIG. 1E, a vacuum is applied to said sheet 2a in said precursor glass V which has reached said viscosity again via passages 6b located on the periphery of said mould 4 to fully stabilize said sheet 2a, and also via channel 6a located in the centre of said mould 4, to enable said sheet 2a to follow the contour of the mould 4.

With reference to FIG. 1F, once the vacuum is stopped, the non-planar sheet 2b obtained is removed from the furnace 3 and is left to cool.

The next step is the ceramming step (not illustrated in the figures) of said non-planar sheet 2b in said precursor glass V of glass-ceramic, to obtain said non-planar product in glass-ceramic 1 ("shown" in FIG. 3) having the shape of a wok.

FIG. 2 shows another embodiment of a mould 14 associated with annular mechanical means 18 to stabilize a sheet 12a in precursor glass V. This stabilization makes it possible to hold said sheet 12a in place before and during applying of a vacuum causing deformation of the sheet 12a, via the channel 16a located in the centre of said mould. Said channel 16a connects the working surface 15 of said mould 14 to a vacuum-creating device 17a (+parts not shown).

FIG. 3 schematically illustrates a non-planar product in glass-ceramic 1 (having the shape of a wok) which can be obtained using the method of the invention. Said figure details the exact shape of said non-planar product (see values indicated in mm of the radii of curvature R). Line AA' in this figure represents the axis of symmetry of the article.

EXAMPLE

The preferred variant of the method of the invention (schematized in FIGS. 1A1, 1A2, 1A3, 1B to 1F) is implemented on sheets 4 mm thick (reference sheets 2 and sheets 2a) in precursor glass V of a black β-quartz glass-ceramic.

Said precursor glass has the following oxide weight % composition:

| | |
|---|---|
| $SiO_2$: | 68.25 |
| $Al_2O_3$: | 19.2 |
| $Li_2O$: | 3.5 |
| MgO: | 1.2 |
| ZnO: | 1.6 |
| BaO: | 0.8 |
| $TiO_2$: | 2.6 |
| $Zr_2O_2$: | 1.7 |
| $As_2O_3$: | 0.6 |
| $Na_2O + K_2O$: | 0.35 |
| $V_2O_5$: | 0.2. |

To obtain the range of working viscosities of reference sheet 2, the following were determined:
the coefficients A=6.350 and B=1.843 of the viscosity curve of the precursor glass V of said β-quartz glass-ceramic in relation to temperature;
the temperature $T_{Vmax}$<950° C. For temperatures of around 930° C. [corresponding to a precursor glass viscosity of $10^{6.55}$ Pa·s ($10^{7.55}$ Po)], it was observed that said reference sheet 2 remained clear within time periods of 30 to 90 s. On the other hand, at temperatures of said sheet of 950° C. or higher [corresponding to a precursor glass viscosity of $10^{6.30}$ Pa·s ($10^{7.30}$ Po)], said reference sheet 2 shows initiated opalisation within times of 30 to 90 s;
the temperature $T_{Vmin}$=860° C. A reference sheet 2 in said precursor glass V shows significant deformation when it reaches a temperature of around 860° C. [corresponding to a precursor glass viscosity of $10^{7.75}$ Pa·s ($10^{8.75}$ Po)], within times of 150 to 300 s.

This data was used to deduce the range of working viscosities lying between $10^{6.30}$ (limit excluded for glass V whose composition is specified above) and $10^{7.75}$ (limit included) Pa·s ($10^{7.30}$ (limit excluded) and $10^{8.75}$ (limited included) Po), within which said reference sheet 2, of thickness 4 mm in said precursor glass V is able to deform without initiated ceramming.

Also, a range of operating temperatures was determined for the conventional furnace used. This lies between $T_{inf}$=880° C. and $T_{sup}$=1000° C., respectively corresponding to a furnace working viscosity of between $10^{7.4}$ and $10^{5.6}$ Pa·s ($10^{8.4}$ and $10^{6.6}$ Po).

The method of the invention was then implemented with a working viscosity of approximately $10^{7.4}$ Pa·s ($10^{8.4}$ Po) (this working viscosity was not precisely measured in the furnace used), a furnace temperature of 900° C., i.e. a furnace working viscosity of $10^{7.05}$ Pa·s ($10^{8.05}$ Po), a residence time of the sheet in the furnace of 165 s, with a vacuum of $-0.7 \times 10^5$ Pa (−0.7 atm) applied to the peripheral area and then in the central area (these vacuums were initiated after times of 45 and 90 s respectively after placing the sheet in the furnace), to produce woks such as illustrated FIG. 3 (from sheets 4 mm thick in precursor glass V of the glass-ceramic whose weight composition is indicated above).

It should also be understood that while the present invention has been described in detail with respect to certain illustrative and specific embodiments thereof, it should not be considered limited to such, as numerous modifications are possible without departing from the broad scope of the present invention as defined in the appended claims.

The invention claimed is:

1. Method for manufacturing a non-planar product of glass-ceramic comprising:
in a furnace, heating an entire sheet of precursor glass of said glass-ceramic, so that said sheet becomes formable without initiating its ceramming;
forming said heated sheet;
cooling said formed sheet; and
ceramming said formed, cooled sheet.

2. The method according to claim 1, wherein said sheet of said precursor glass of said glass-ceramic has a thickness of 3 to 7 mm.

3. The method according to claim 1 further comprising: heating a reference sheet of precursor glass of said glass-ceramic in order to
   a. determine from the heating of the reference sheet a range of working viscosities $\mu_t$ of said reference sheet of a precursor glass of said glass-ceramic at which said reference sheet of said precursor glass is able to deform before the onset of ceramming; and
   b. determine a range of furnace operating temperatures, delimited by a lower temperature and an upper temperature; said lower temperature allowing the heated reference sheet of said precursor glass to be brought to a deformable state within a time of less than 10 minutes, and said upper temperature corresponding to a maximum temperature of the furnace to which said reference sheet of said precursor glass can be exposed, for 30 to 90 seconds, before the onset of ceramming.

4. The method according to claim 3, further comprising:
   c. heating a furnace containing a mould whose working surface is connected via at least one channel, through a structure of said mould, to a vacuum-creating device, up to a temperature $T_F$ lying within said range of operating temperatures; said working surface of said mould having a shape adapted to impart a desired shape for said glass-ceramic to said sheet of precursor glass;
   d. placing a sheet of said precursor glass of said glass-ceramic on said mould; said sheet being of equal or similar thickness to that of said reference sheet;
   e. leaving said sheet on said mould in said furnace at said temperature $T_F$, until it reaches a viscosity $\mu$ lying within said range of working viscosities $\mu_t$;
   f. applying a vacuum, at said at least one channel of said mould, to said sheet which has reached said viscosity $\mu$, thereby enabling said sheet to assume the shape of the mould;
   g. removing the non-planar sheet obtained from the furnace and leaving it to cool;
   h. ceramming said non-planar sheet of said precursor glass of said glass-ceramic, to obtain said desired non-planar product in glass-ceramic.

5. The method according to claim 4, wherein said sheet of said precursor glass placed on said mould, before application of the vacuum via at least one channel advantageously arranged in a center of said mould, is stabilized on its periphery by mechanical means and/or by application of a vacuum via at least one channel arranged on the periphery of said mould.

6. The method according to claim 1, wherein the sheet of said precursor glass of said glass-ceramic is pre-heated before it is placed in the furnace.

7. The method according to claim 1, wherein the cooling of said non-planar sheet is controlled.

8. The method according to claim 1, wherein said precursor glass is a precursor glass of a glass-ceramic containing a solid solution of β-quartz or β-spodumene as a main crystalline phase.

9. The method according to claim 8, wherein a range of working viscosities $\mu_t$ of said reference sheet of said precursor glass (V) lies between $10^{6.30}$ and $10^{7.75}$ Pa·s ($10^{7.30}$ and $10^{8.75}$ Po) and a working viscosity of the furnace lies between $10^{5.6}$ and $10^{7.4}$ Pa·s ($10^{6.6}$ and $10^{8.4}$ Po).

10. The method according to claim 1, wherein said furnace comprises a lower part and an upper part able to be separated from each other at least in part; said lower part being able to be lowered.

11. The method according to claim 1, wherein the furnace is a resistively heated furnace.

12. The method according to claim 1, wherein the precursor glass has a composition, expressed as weight % of oxides, comprising:

| | |
|---|---|
| $SiO_2$: | 68.25 |
| $Al_2O_3$: | 19.2 |
| $Li_2O$: | 3.5 |
| $MgO$: | 1.2 |
| $ZnO$: | 1.6 |
| $BaO$: | 0.8 |
| $TiO_2$: | 2.6 |
| $Zr_2O_2$: | 1.7 |
| $As_2O_3$: | 0.6 |
| $Na_2O + K_2O$: | 0.35 |
| $V_2O_5$: | 0.2. |

* * * * *